United States Patent [19]
Samokhin et al.

[11] 4,272,163
[45] Jun. 9, 1981

[54] ELECTROCHROMIC INDICATOR

[76] Inventors: Andrei V. Samokhin, korpus 815, kv. 96; Boris G. Bekker, korpus 851, kv. 34, both of Moscow, 103527; Alexandr N. Davydov, korpus 425, kv. 62, Moscow, 103498, all of U.S.S.R.

[21] Appl. No.: 970,811

[22] Filed: Dec. 18, 1978

[30] Foreign Application Priority Data

May 16, 1978 [SU] U.S.S.R. .............................. 2609551

[51] Int. Cl.³ .............................................. G02F 1/17
[52] U.S. Cl. .................................................... 350/357
[58] Field of Search ........................ 350/357; 252/408

[56] References Cited
U.S. PATENT DOCUMENTS

| | | | |
|---|---|---|---|
| 3,521,941 | 7/1970 | Deb et al. | 350/357 |
| 3,944,333 | 3/1976 | Leibowitz | 350/357 |
| 4,068,928 | 1/1978 | Meyers et al. | 350/357 |
| 4,116,545 | 9/1978 | Reddy | 350/357 |
| 4,175,838 | 11/1979 | Randin | 350/357 |

Primary Examiner—James W. Davie
Attorney, Agent, or Firm—Lackenbach, Lilling & Siegel

[57] ABSTRACT

The electrochromic indicator according to the invention is a multilayer structure and comprises in a sandwich layered arrangement an optically transparent first substrate, an optically transparent first electrode, a layer of a solid inorganic electrochromic material, and a layer of an electrolyte. Interposed between the electrolyte layer and a second electrode is a layer which is a film of an oxidation-reduction polymer, or a filled polymer film, or a paste containing an oxidized form (Ox) and a reduced form (Red) of compounds which produce on the second electrode a reversible oxidation-reduction reaction of the following type:

$$Red \rightleftarrows Ox + m\bar{e},$$

where
$\bar{e}$ is an electron, and
m is the quantity of electrons involved in the reaction, with an exchange of electrons by means of the second electrode, and also containing compounds which are sources of cations similar to cations of the electrolyte layer. A second substrate adjoins the second electrode.

10 Claims, 1 Drawing Figure

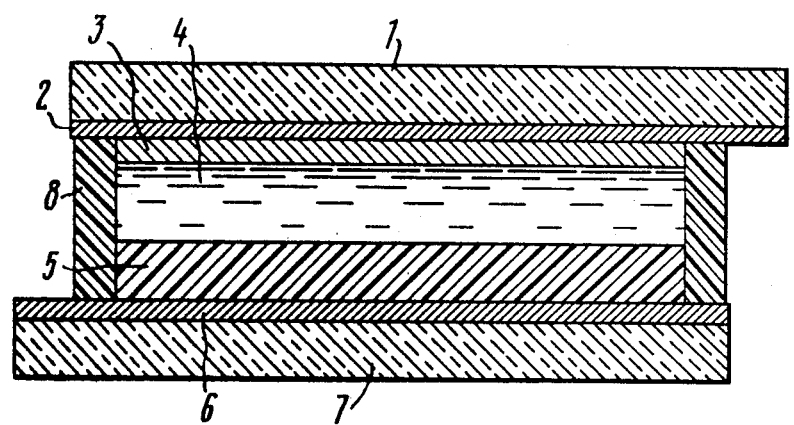

ELECTROCHROMIC INDICATOR

FIELD OF THE INVENTION

The present invention relates to electrooptic visual displays and, more particularly, to an electrochromic indicator chiefly intended for microcalculators, electronic clocks and watches and other electronic devices.

BACKGROUND OF THE INVENTION

Electrochromic indicators employ solid inorganic electrochromic materials. An electrochromic material is responsive to an application of an electric field of a given polarity so that it changes from a first persistent state, in which it is essentially non-absorptive of electromagnetic radiation in a given wavelength region, to a second persistent state in which it absorbs electromagnetic radiation. Once in said second state, such a material is responsive to an application of an electric field of the opposite polarity to return to its first state. Electrochromic materials include oxides, sulfides and some other compounds of transition metals, and are dealt with in U.S. Pat. Nos. 3,521,941 and 3,819,252, Cl. 350-357. The electrochromic effect is observed in thin films of oxides of transition metals, such as tungsten oxide, after a double injection into the film of an electrochromic material of electrons and protons (or ions of alkali metals), whereby colored compounds are produced, such as tungsten bronze if use is made of tungsten oxide. Protons (or ions of metals) come from the electrolyte. The mechanism of electrochromic effect in oxides of transition metals is described by F. Chang (cf. F. Chang, Proceedings of SID, 1975, vol. 16/3, pp. 168–177).

Coloration of an electrochromic film normally occurs when the film is placed between two electrodes whereof at least one is transparent. In order to provide for reversible operation, i.e. alternating coloration and bleaching, the electrochromic layer is separated from one of the electrodes by a layer of a material which possesses ionic conductivity and serves as a barrier against the transfer of electrons.

Electrically induced coloration of films of $WO_3$ is believed to be due to the formation of tungsten bronze in the course of this reaction:

$$x\bar{e} + xA^+ + WO_3 \rightleftharpoons A_xWO_3x\bar{e}, \qquad (1)$$

where x is a positive integer, $A^+$ is a positive ion, for example, $H^+$, $Na^+$, $Li^+$, $K^+$, e is an electron, $WO_3$ is a colorless film, and $A_xWO_3xe$ is 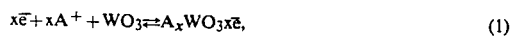 a colored film.

Electrons are injected into the film of $WO_3$ from an adjacent electrode: this means that the electrode adjoining the film of $WO_3$ must be negative to induce coloration. Positive ions arrive from the ionic conductivity layer which serves as a barrier against the electron transfer. As electrons and positive ions are brought together, they produce compounds of the $A_x+WO_3xe$ type, which have coloration centers due to the localization of electrons on ions of tungsten. In this case the process (1) proceeds from left to right. With a reversal of polarity of the applied voltage, i.e. when the electrode adjacent to the film of $WO_3$ becomes positive, electrons are forced out of the film of $WO_3$, and the latter is bleached. The advent of electrons to the film of $WO_3$ from the other electrode is prevented by the barrier layer. In this case the process (1) proceeds from right to left.

Several types of electrochromic indicators have been developed recently which feature improvements in certain working parameters and better reliability, as compared to the earlier types. However, none of the existing electrochromic indicators can boast of sufficiently long service life because of a number of irreversible chemical and electrochemical processes occurring in such indicators.

There is known an electrochromic indicator (cf. U.S. Pat. No. 3,521,941, Cl. 350-357) which is a multilayer structure comprising in a sandwich layered arrangement an optically transparent substrate, an optically transparent first electrode, a layer of a solid inorganic electrochromic material, an insulating layer, and a second electrode. The indicator may also include a second substrate.

In the electrochromic indicator under review, the insulating layer is a thin film of calcium fluoride which absorbs moisture, carbon dioxide, ammonia and other gases from the environment. The water-soluble gases serve as an electrolyte containing cations which are necessary for electrically induced coloration of the electrochromic layer. The indicator lacks a permanent source of cations, so the supply of cations is dependent upon the state of the surrounding medium. Indicators of this type can only live through a limited number of coloration-bleaching cycles, and their response in inadequate.

From the standpoint of technical essence, the closest prototype of the present invention is the electrochromic indicator disclosed in U.S. Pat. No. 3,944,333, Cl. 350-357. This indicator is a multilayer structure comprising in a sandwich layered arrangement an optically transparent first substrate, an optically transparent first electrode, a layer of a solid inorganic electrochromic material, a layer of an electrolyte, a second electrode, and a second substrate.

The electrolyte is sulfuric acid contained in pores of a thin film of a material which is chemically inert to sulfuric acid.

As stated above, the electrolyte is a source of cations in an electrochromic indicator; as a second-class conductor, the electrolyte also prevents the transfer of electrons from the second electrode to the electrochromic layer.

According to common belief, the principle of operation of the foregoing types of electrochromic indicators is as follows. As electric current is passed from the second electrode to the transparent first electrode, cations and electrons are injected into the electrochromic layer to produce coloration centers therein. Reversal of the current makes the coloration centers disintegrate, and the electrochromic layer is bleached. To ensure reversible operation of an electrochromic indicator, i.e. an alternation of coloration and bleaching, one must meet certain conditions. First, the transparent electrode is expected to serve as a source of electrons, as well as to provide for a transfer of electrons in the opposite direction. Second, the electrolyte must serve as a source of cations and provide for a transfer of cations in the opposite direction.

The indicator according to U.S. Pat. No. 3,944,333, Cl. 350-357, satisfies these requirements. At the same time it has certain disadvantages. As electric current is passed through the indicator, irreversible electrochemical reactions are initiated on the boundary between the electrolyte and the second electrode. Products of these reactions, including peroxides, accumulate in the indicator and destroy the second electrode; they also affect the composition of the electrolyte and the electrochromic layer. Eventually the indicator is rendered inoperative.

The electrolyte of the indicator under review is such that cations, including ions of hydrogen, are produced therein due to the electrolytic dissociation of the acid. The transfer of anions to the second electrode is of the diffusive and electric types. On the surface of the second electrode, anions enter into electrochemical reactions and accumulate in the electrolyte as reduced or oxidized compounds. When strong acids are used, anions are diffused throughout the entire volume of the indicator and may cause chemical decomposition of the second electrode and the electrochromic layer. Anions may also be the cause of a depressurization of the indicator. Significantly, this may happen during storage, i.e. before the indicator is put into operation. All these factors affect the reliability and account for short life of the indicator.

SUMMARY OF THE INVENTION

It is an object of the present invention to provide an electrochromic indicator featuring long service life and high reliability.

The invention essentially consists in providing an electrochromic indicator which is a multilayer structure comprising in a sandwiched arrangement an optically transparent first substrate, an optically transparent first electrode, a layer of a solid inorganic electrochromic material, a layer of an electrolyte, a second electrode, and a second substrate, the indicator being characterized, according to the invention, in that interposed between the layer of electrolyte and the second electrode is an additional layer which is a film of an oxidation-reduction polymer, or a filled polymer film, or a paste containing an oxidized form (Ox) and a reduced form (Red) of compounds producing on the second electrode a reversible oxidation-reduction reaction of the following type:

  (2)

where $\bar{e}$ is an electron, and m is the quantity of electrons involved in the reaction, with an exchange of electrons by means of the second electrode, and also containing compounds which are sources of cations similar to cations of the electrolyte layer.

It is expedient that the layer of filled polymer film be polyvinyl alcohol-based, and that the filler be powdered graphite in an amount of 15 to 20 percent by weight, powdered sulfonated polyvinylhydroquinone in an amount of 10 to 12 percent by weight, chloranil in an amount of 0.05 to 0.1 percent by weight, and borax-succinate buffer mixture in an amount of 5 to 7 percent by weight.

Electrochemically, the oxidized and reduced forms of compounds contained in the additional layer, and the second electrode make up a reversible redox electrode whereon no products of irreversible electrochemical reactions are accumulated. This feature accounts for a prolonged service life and high reliability of the electrochromic indicator of this invention. The presence of a source of cations in the additional layer enhances the electrical conductivity of that layer, whereas the presence in the additional layer of cations similar to those of the electrolyte provides for a continuous ion flow in the course of operation.

BRIEF DESCRIPTION OF THE ATTACHED DRAWING

Other objects and advantages of the present invention will become more apparent from a consideration of the following detailed description of a preferred embodiment thereof to be read in conjunction with the accompanying drawing which is a cross-sectional view of an electrochromic indicator in accordance with the invention.

DETAILED DESCRIPTION OF THE INVENTION

Referring to the attached drawing, the electrochromic indicator according to the invention is a multilayer structure and comprises an optically transparent substrate 1 which is a glass plate 1. Applied onto the glass plate is a transparent electrode 2. In the embodiment under review, the electrode 2 is of $SnO_2$. Applied onto the transparent electrode 2 is a layer 3 of a solid inorganic electrochromic material. In the embodiment under review, this material is $WO_3$ applied onto the electrode 2 by means of vacuum evaporation.

Adjacent to the electrochromic layer 3 is a layer 4 of an electrolyte which is a gel of sulfuric acid and polyvinyl alcohol. The ratio of the two ingredients is such that the electrical conductivity of the gel-like electrolyte is 0.4 $ohm^{-1}cm^{-1}$.

Next to the electrolyte layer 4 is a layer 5 which is a film of an oxidation-reduction polymer, or a filled polymer film, or a paste containing an oxidized form (Ox) and a reduced form (Red) of compounds producing on a second electrode adjacent to this layer a reversible oxidation-reduction reaction of this type:

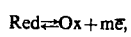

where $\bar{e}$ is an electron, and m is the quantity of electrons involved in the reaction, with an exchange of electrons by means of the second electrode, and also containing compounds which are sources of cations similar to cations of the electrolyte layer 4.

In the embodiment under review, the layer 5 is a film of an oxidation-reduction polymer, namely, sulfonated polyvinylhydroquinone. The sulfogroups of this polymer are sources of protons, i.e. cations similar to those contained in the electrolyte.

Next to the layer 5 is a second electrode 6. In the embodiment under review, the electrode 6 is a film of platinum applied onto a second substrate which is a glass plate 7.

The multilayer structure is sealed with a layer 8 which is a glue comprising epoxy resin, polyamide resin and a filler which is boron nitride. The ratio of the three ingredients is 2:1:2 parts by weight.

Various modifications may be made in the invention without departing from the scope and spirit thereof. For example, individual layers of the multilayer structure may be of materials other than those mentioned above.

The following examples specify materials that can be used for the electrolyte layer 4, the layer 5 and the electrode 6 described above and shown in the attached drawing.

EXAMPLE 1

An electrochromic indicator, wherein the electrolyte layer 4 is a film of polyvinylchloride filled with a powdered sulfonated copolymer of styrene and divinylbenzene; the layer 5 is a film of polyvinylchloride filled with powdered carbon sitall in an amount of 20 percent by weight, chloranil in an amount of 5 percent by weight, hydrochloranil in an amount of 5 percent by weight, tributyl phosphate in an amount of 5 percent by weight, and a buffer mixture based on valeric acid and potassium valerate and in an amount of 6 percent by weight; the second electrode 6 is a film of antimony applied onto the substrate by vacuum evaporation.

EXAMPLE 2

An electrochromic indicator, wherein the composition of the electrolyte is like that of Example 1; the layer 5 is a paste comprising:

| | |
|---|---|
| polyquinone resin, | 30 percent by weight |
| sulfonated copolymer of styrene and divinylbenzene, | 3 percent by weight |
| graphite powder, | 15 percent by weight |
| nonyl alcohol, | 7 percent by weight |
| borax-succinate buffer mixture, | 5 percent by weight |
| cyclohexanone, | 40 percent by weight. |

The second electrode 6 is a film of palladium applied onto the substrate by vacuum evaporation.

EXAMPLE 3

An electrochromic indicator, wherein the electrolyte layer 4 is a cation-exchange membrane of sulfonated polystyrene reinforced with polyfluoroethylene resin; the layer 5 is polyvinyl alcohol-based filled polymer film, the filler comprising:

| | |
|---|---|
| graphite powder, | 15 percent by weight |
| powdered sulfonated polyvinylhydroquinone, | 10 percent by weight |
| chloranil, | 0.05 percent by weight |
| borax-succinate buffer mixture, | 5 percent by weight. |

The moisture content in the film is 10 percent by weight.

The second electrode 6 is a film of palladium applied onto the substrate by vacuum evaporation.

EXAMPLE 4

An electrochromic indicator, wherein the composition of the electrolyte is like that of Example 3; the layer 5 is a polyvinyl alcohol-based filled polymer film, the filler comprising:

| | |
|---|---|
| graphite powder, | 20 percent by weight |
| powdered sulfonated polyvinylhydroquinone, | 12 percent by weight |
| chloranil, | 0.1 percent by weight |
| borax-succinate buffer mixture, | 7 percent by weight. |

The moisture content in the film is 10 percent by weight.

The second electrode 6 is a film of antimony applied onto the substrate by vacuum evaporation.

EXAMPLE 5

An electrochromic indicator, wherein the composition of the electrolyte is like that of Example 3; the layer 5 is a polyvinyl alcohol-based filled polymer film, the filler comprising:

| | |
|---|---|
| graphite powder, | 17.5 percent by weight |
| powdered sulfonated polyvinylhydroquinone, | 11 percent by weight |
| chloranil, | 0.075 percent by weight |
| borax-succinate buffer mixture, | 6 percent by weight. |

The moisture content in the film is 10 percent by weight.

The second electrode 6 is a film of platinum applied onto the substrate by vacuum evaporation.

The electrochromic indicator according to the invention operates as follows. A voltage pulse is applied between the electrodes 2 and 6. The polarity is such that the current flows from the second electrode 6 to the transparent electrode 2 and initiates different processes in the structure of the indicator. On the boundary between the second electrode 6 and the layer 5, the flow of current is determined by this electrochemical reaction:

$$AH \rightarrow B + H^+ + \bar{e}, \quad (3)$$

where
A is a reduced compound,
B is an oxidized compound, and
$\bar{e}$ is an electron.

The electromagnetic field drives free ions of hydrogen from the electrolyte layer 4 and the layer 5 to the electrochromic layer 3 so that these ions are injected into the layer 3. As this takes place, an equivalent quantity of electrons is injected from the transparent electrode 2 into the layer 3. The layer 3, which is a film of $WO_3$, is transparent until voltage is applied to the indicator. The injection of protons and electrons produces coloration centers in the layer 3, which are believed to be due to the formation of tungsten bronze according to reaction (1). As a result, the layer 3 exhibits a blue coloration.

The tungsten oxide-based electrochromic layer has two persistent states: it is transparent in visible light when it consists of tungsten dioxide ($WO_3$) and is blue when it consists of tungsten bronze (); after a removal of voltage, the layer 3, which is on the transparent electrode 2, retains its coloration.

To bleach the colored layer 3, a voltage pulse of the opposite polarity is applied to the electrodes 2 and 6 of the indicator. As this takes place, electrons are driven from the electrochromic layer 3 to the electrode 2, while protons are driven into the electrolyte layer 4; as a result, the layer 3 is bleached. The electric field transfers protons from the layers 4 and 5 to the second electrode 6; at the reversible oxidation-reduction electrode formed by the layer 5 and the second electrode 6 the following electrochemical reaction takes place:

$$B + H^+ + \bar{e} \rightarrow AH \qquad (4)$$

This reaction brings the indicator back to its original state and rules out any irreversible side reactions on the second electrode 6. This minimizes the accumulation of products of irreversible electrochemical reactions on the second electrode 6. The overall result is a longer service life and higher reliability of the indicator.

What is claimed is:

1. In a multilayered electrochromic indicator comprising:
   a first substrate made of an optically transparent material;
   a first electrode made of an optically transparent material contacting said first substrate;
   a layer of a solid inorganic electrochromic material contacting said first electrode;
   a layer of an electrolyte contacting said layer of solid inorganic electrochromic material;
   a second electrode; and
   a second substrate contacting said second electrode; the improvement which comprises:
   interposing a film layer of an oxidation-reduction polymer in contact with and between said electrolyte layer and said second electrode, wherein
   said film of the oxidation-reduction polymer contains an oxidized form (Ox) and a reduced form (Red) of compounds which produce on said second electrode a reversible oxidation-reduction reaction of the following type:

$$Red \rightleftharpoons Ox + m\bar{e},$$

where
   $\bar{e}$ is an electron, and
   m is the quantity of electrons involved in the reaction, with an exchange of electrons by means of said second electrode, and also containing compounds which are sources of cations similar to cations of said electrolyte layer.

2. The multilayered electrochromic indicator of claim 1, wherein said film layer of an oxidation-reduction polymer is sulfonated polyvinylhydroquinone.

3. In a multilayered electrochromic indicator comprising:
   a first substrate made of an optically transparent material;
   a first electrode made of an optically transparent material contacting said first substrate;
   a layer of a solid inorganic electrochromic material contacting said first electrode;
   a layer of an electrolyte contacting said layer of solid inorganic electrochromic material;
   a second electrode; and
   a second substrate contacting said second electrode; the improvement which comprises:
   interposing a filled polymer film layer in contact with and between said electrolyte layer and said second electrode, wherein
   said filled polymer film contains an oxidized form (Ox) and a reduced form (Red) of compounds which produce on said electrode a reversible oxidation-reduction reaction of the following type:

$$Red \rightleftharpoons Ox + me,$$

where
   e is an electron, and
   m is the quantity of electrons involved in the reaction, with an exchange of electrons by means of said second electrode, and also containing compounds which are sources of cations similar to cations of said electrolyte layer.

4. The multilayered electrochromic indicator of claim 3, wherein said filled polymer film layer comprises polyvinylchloride filled with powdered carbon sitall, chloranil, hydrochloranil, tributyl phosphate, and a buffer mixture based on valeric acid and potassium valerate.

5. The multilayered electrochromic indicator of claim 3, wherein said filled polymer film layer comprises a polyvinyl alcohol based filled polymer film, with the filler comprising graphite powder, powdered sulfonated polyvinylhydroquinone, chloranil, and a borax-succinate buffer.

6. An electrochromic indicator as claimed in claim 3, wherein said filled polymer film is polyvinyl alcohol-based, the filler comprising powdered graphite in an amount of 15 to 20 percent by weight, powdered sulfonated polyvinylhydroquinone in an amount of 10 to 12 percent by weight, chloranil in an amount of 0.05 to 0.1 percent by weight, and borax-succinate buffer mixture in an amount of 5 to 7 percent by weight.

7. In a multilayered electrochromic indicator comprising:
   a first substrate made of an optically transparent material;
   a first electrode made of an optically transparent material contacting said first substrate;
   a layer of a solid inorganic electrochromic material contacting said first electrode;
   a layer of an electrolyte contacting said layer of solid inorganic electrochromic material;
   a second electrode; and
   a second substrate contacting said second electrode; the improvement which comprises:
   interposing a paste layer in contact with and between said electrolyte layer and said second electrode, wherein
   said paste layer contains an oxidized form (Ox) and a reduced form (Red) of compounds which produce on said second electrode a reversible oxidation-reduction reaction of the following type:

$$Red \rightleftharpoons Ox + m\bar{e},$$

where
   $\bar{e}$ is an electron, and
   m is the quantity of electrons involved in the reaction, with an exchange of electrons by means of said second electrode, and also containing compounds which are sources of cations similar to cations of said electrolyte layer.

8. The multilayered electrochromic indicator of any of claims 5, 6 or 7, wherein said electrolyte layer is selected from the group consisting of a gel of sulfuric acid and polyvinyl alcohol, a sulfonated copolymer of styrene and divinylbenzene, and a cation-exchange membrane of sulfonated polystyrene reinforced with polyfluorethylene resin.

9. The multilayered electrochromic indicator of claim 8, whrein said electrolyte layer is a gel of sulfuric acid and polyvinyl alcohol having an electrical conductivity of 0.4 ohm$^{-1}$cm$^{-1}$.

10. The multilayered electrochromic indicator of claim 7, wherein said paste layer comprises polyquinone resin, a sulfonated copolymer of styrene and divinylbenzene, graphite powder, nonyl alcohol, a borax-succinate buffer, and cyclohexanone.

* * * * *